United States Patent [19]
Miller et al.

[11] Patent Number: 5,308,934
[45] Date of Patent: May 3, 1994

[54] LOAD CELL SCALE MOUNTING DEVICE

[75] Inventors: Carl A. Miller, Fairfield; Adonis A. Halaby, Stamford, both of Conn.

[73] Assignee: Pitney Bowes Inc., Stamford, Conn.

[21] Appl. No.: 996,274

[22] Filed: Dec. 24, 1992

[51] Int. Cl.$^5$ .................. G01G 21/28; G01G 21/10
[52] U.S. Cl. .................................... 177/244; 177/128
[58] Field of Search ............... 177/128, 244, 255, 211

[56] References Cited

U.S. PATENT DOCUMENTS 3,891,041  6/1975  Hall et al. ........................ 177/255
3,894,592  7/1975  Andersson et al. ............. 177/211 X
4,583,607  4/1986  Freeman ............................ 177/244
5,205,369  4/1993  Neeleman ....................... 177/244 X Primary Examiner—George H. Miller, Jr.
Attorney, Agent, or Firm—Peter Vrahotes; Melvin J. Scolnick

[57] ABSTRACT

The instant invention is directed to a mounting device for a load cell scale that is a component of a high speed sheet processing system. The invention has particular utility in a mail processing machines which include the step of weighing mailpieces. The mounting device of the instant invention is one that provides reliability, ease of manufacture, and ease of assembly. In addition, isolation members are included that isolate the scale platform from vibrations caused by the scale's environment.

4 Claims, 3 Drawing Sheets

LOAD CELL SCALE MOUNTING DEVICE

BACKGROUND OF THE INVENTION

Load cell weighing scales are well known devices that are used for weighing a variety of items. A load cell weighing scale usually includes a beam that has with oval openings and four strain gauges bonded to the thin portions formed by the oval openings so that a load applied to one end of the beam can be weighed. The load causes the beam to deform and this deformation in the strain gauges. Such change in resistance the strain gauges causes the voltage in electrical power applied to the strain gauges. This change in voltage will be directly proportional to the weight of the load on the scale and in this way the weight of the load can be determined.

Although load cell scales have been used extensively, the use of such a scale in a high speed sheet conveying apparatus is not common. In a device such as a mailing machine, mailpieces are conveyed in series past a number of stations for performing tasks in the processing of the mailpieces. These tasks could include placing inserts into an envelope, sealing the envelope to form a mailpiece, and placing a postage meter indicia on the mailpiece. In order to determine the amount of postage required, the mailpiece must first be weighed. A weighing scale for performing such a task should be able to operate at least at the same speed as the other components in the system, this usually being processing in excess of one mailpiece a second. Heretofore, load cell scales were not generally available that could meet this stringent requirement. Clearly, it would be advantageous to provide a load cell scale with appropriate mounting members so that high speed processing can be achieved.

SUMMARY OF THE INVENTION

A load cell weighing scale has been conceived with which one is able to achieve weighing at a high rate of speed. The most important feature of such a scale resides in the mounting device that supports the load cell. Because of the rapid processing of sheets, stresses are placed upon the load cell which the mounting device must be able. The mounting device of the instant invention not only serves this purpose but, just as importantly, it is also of low cost, easily assembled, and easily manufacturable.

DETAILED DESCRIPTION OF THE PREFERRED EMBODIMENT

Figure 1:
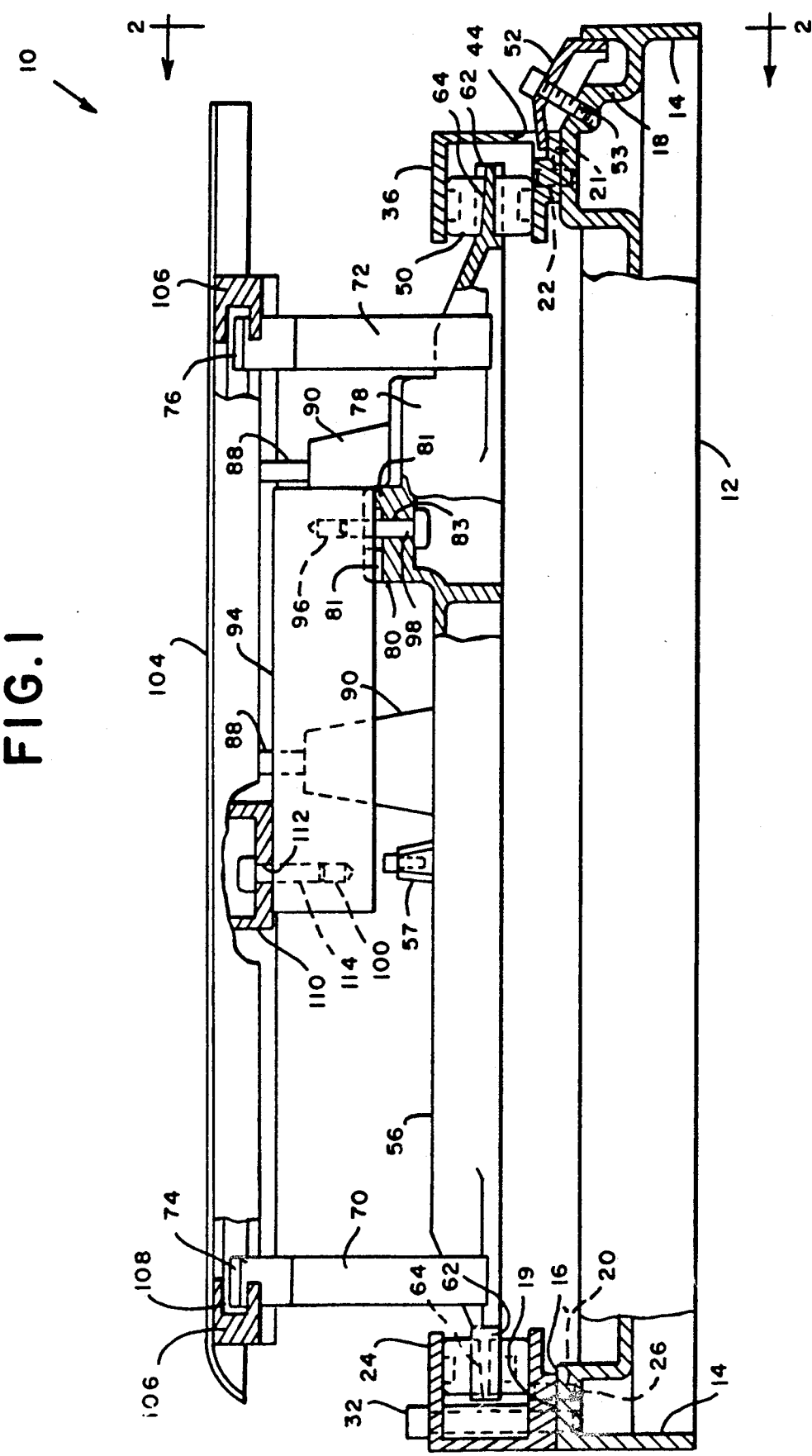
FIG. 1 shows a cross sectional, longitudinal view, partially cut away, of a weighing scale that incorporates the features of the instant invention.
Figure 3:
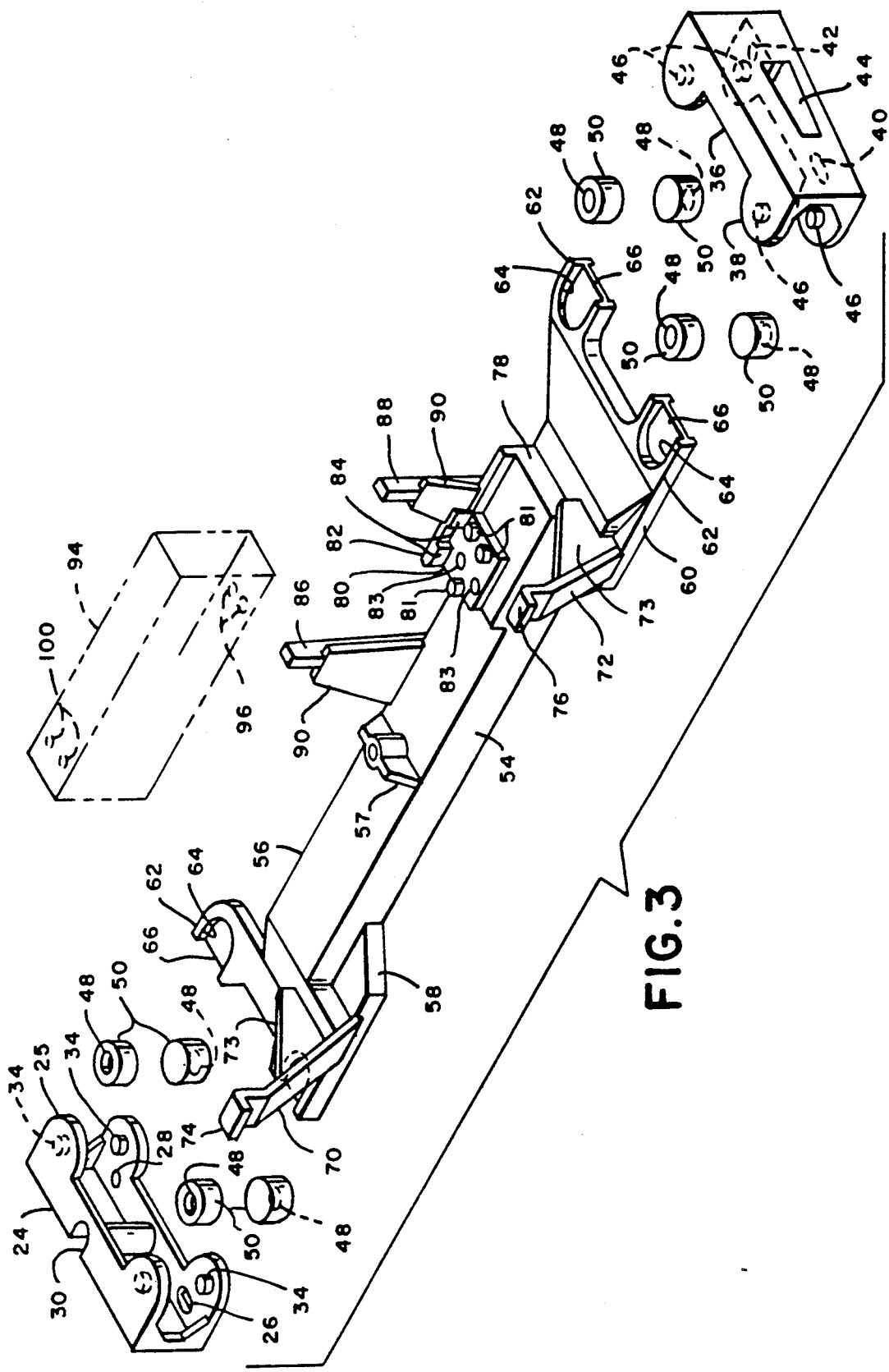
FIG. 3 is a perspective view of portions of the scale shown in FIG. 1.

With reference to the drawing, a load cell scale in which the invention can be practiced is shown generally at 10. A base 12 is provided that has laterally extending raised portions 14 at its longitudinal ends, with one raised portion 16 forming a generally square cross section of the side walls having a ledge and the other raised portion 18 having a generally s-shaped member configuration. These two raised portions 16, 18 have upper surfaces 19, 21, respectively, that form an angle relative to the horizontal. A pair of laterally aligned pins 20, 22 is secured to each of the upper surfaces 19, 21. A first clamp 24 that is tapered from back to front as seen in FIGS. 1 and 3, has four fingers 25 extending therefrom in paired, spaced relationship and an elongated opening 26 and a circular opening 28 at the bottom thereof to receive the pins 20. The reason for the elongated opening 26 is to provide clearance during assembly of the components of the scale 10. The clamp 24 has indentation 30 so as to receive a bolt 32 to be secured to the upper surface 19 of the raised portion 16. The tapered clamp 24 also has bosses 34 extending inwardly from each of the fingers 25.

On the opposite longitudinal side of the scale 10 is another back to front tapered clamp 36 also having four fingers 38 extending inwardly therefrom in paired, spaced relationship and an elongated opening 40 and a circular opening 42 at the base thereof. The tapered clamp 36 also has a laterally extending opening 44 on the backside thereof. Bosses 46 extend inwardly from the fingers 38 of the clamp 36. The bosses 34 and 46 of the tapered clamps 24, 46, respectively, are received within openings 48 of a plurality of bushings 50, the bushings being paired vertically so that a pair of bushings is located intermediate each of the fingers 25, 38, of the clamps 24, 36, respectively.

The clamps 24, 36 are tapered so as to conform to the raised portions 14 and render the upper surfaces of the clamps level. The raised portions 14 were required to form an angle because of the particular requirements of the apparatus in which the weighing scale 10 was mounted in the reduction to practice of the invention and such taperings may not be required in other environments.

A longitudinally extending bridge 54 having a central beam 56 is located above the base 12 and has a stop 57 intermediate its ends. Secured to the ends of the beam 56 are a pair of pads 58, 60, each of which is fanned into a pair of fingers 62 outwardly extending therefrom. Each finger 62 has a circular recess 64 that has located vertically intermediate its sides a tapered edge 66. The fingers 62 are received within the clamps 24, 36 with the tapered edges 66 being received intermediate a pair of aligned bushings 50. The tapered edges 66 are tapered outwardly, i.e. the edges become thinner as they extend outwardly from the pads 58, 60, so as to be more easily urged between the paired bushings 50 that are held in place by the studs 34, 46. The bushings 50 are made of a resilient material so as to provide isolation of the bridge 54 from the base 12.

Extending on opposite ends of the beam 56 are rigid struts 70, 72 that are secured to the beam by support members 73 that are attached to the pads 58, 60. The struts 70, 72 have fingers 74, 76, respectively, extending therefrom. A platform 78 is located at one longitudinal end of the beam 56 and has thereon a leveling seat 80, whose function will be described hereinafter. The leveling seat 80 has a plurality of pads 81, a pair of through openings 83, and a side wall 82 having a pair of lands 84 thereon. A pair of longitudinally spaced uprights 86, 88 are secured to the beam by ribs 90.

A load cell 94 has a pair of threaded openings 98 each of which receives a screw 98 that extends through the openings 83 to be received and secured by the threaded openings 96. The combination of the pads 81 upon which the bottom of the load is rested, the lands 84 against which one side of the load cell abuts and the bolts 102 extending through the openings 83 and screwed into the threaded openings 96 assure the load cell being mounted on the seat 80 in a level, properly aligned position.

Figure 2:
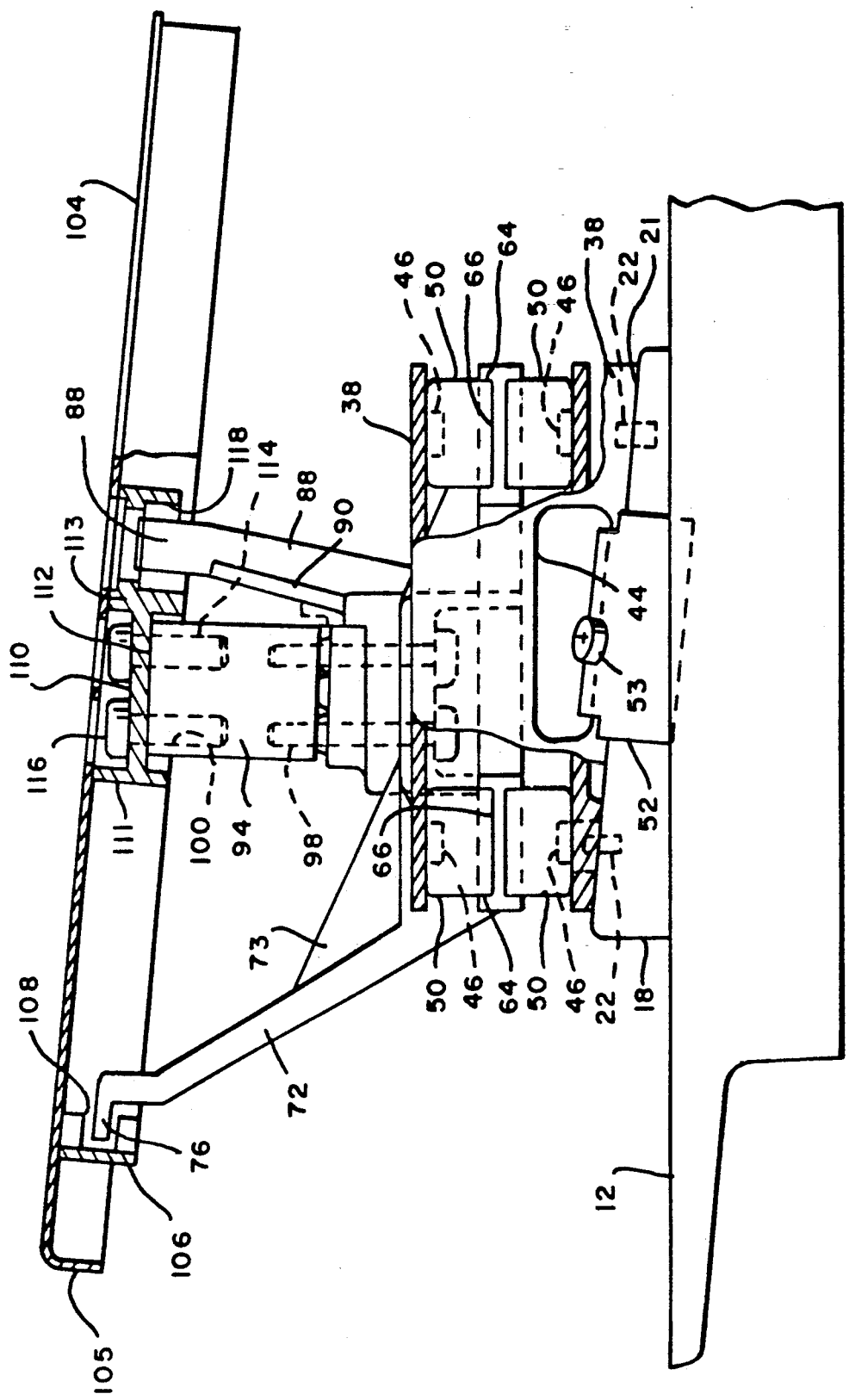
FIG. 2 is a view taken along the lines 2—2 of FIG. 1.

A platform 104, having the form of a cover with a depending rim 105, is located above the bridge 56. A web 106 (only portions of which are shown) is secured to the underside of the platform 104. The web 106 forms two recesses 108 that receive the fingers 74, 76 of the struts 70, 72. It will be noted that the fingers 74, 76 are located intermediate the upper and lower surfaces of the recesses, and do not contact the same in the normal position as seen in FIG. 2. With such structure the struts 72, 72 do not interface with the weighing operation. The uprights 86 and 88 support a reflective photocell device (not shown) that is aligned with an opening 114 formed by the web 106. The web 106 also forms a bracket 110 with openings 112 therein for receiving screws 114 that are received within threaded openings 100 of the load cell 94 for securing the platform 104 to the load cell 94.

The platform 104 is at an angle relative to the horizontal. This is accomplished by the configuration of the bracket assembly 110 which has a one wall 111 higher than the other 113. The reason for the platform being at an angle is so that it will act as a guiding member whereby mailpieces conveyed thereacross are urged toward a locating plate (not shown). This is important for the printing of an indicia on a mailpiece at the proper location.

It will be appreciated that the scale described is one in which flat items, such as mailpieces, are conveyed thereacross. Although the means for such conveyance is not shown, attention is directed to U.S. Pat. Nos. 4,856,602, 4,848,492, and 4,836,311 for description of mechanisms for conveying articles such as a mailpieces across the platform of a scale, stopping and holding the mailpieces during the weighing operation and removing the mailpieces thereafter. As stated previously, the stop 57 is spaced relative to the load cell 94. The reason for such spacing of the stop 57 relative to the platform 104 is for the purpose of protecting the platform should an overload condition exist. The use of a stop 57 is well known.

In assembling the mounting device for the load cell, the bolt 32 is secured to the base 12 and the clamp 24 is placed on the raised portions 16, 28 with the bolt received within the indentation 30. Paired annular bushings 50 are placed within the fingers 25 of the clamp 24 so that the bosses 34 are received within the openings 48 of the bushings. The bridge 54 is then attached to the clamp 24 by having the tapered edges 66 inserted between the paired bushings 50 that had been positioned within the clamp 24. The bridge 54 is positioned so that the walls formed by the circular recesses 64 abut against the bushings 50. After the one end of the bridge 54 is received within the clamp 24, paired bushings 50 are inserted into the other clamp 36 with the openings 48 of the bushings receiving the bosses 46. The clamp 36 is then positioned so as to receive the fingers 62 of the pad 60 by having the tapered edges 66 inserted between the paired bushings 50. After such insertion, the openings 26, 28 of clamp 24 and the openings 40, 42 of the clamp 36 receive the pins 22 of the mounting bracket 18 thereby properly locating the clamps on the base 12. Once more, the openings 26, 40 are elongated so as to provide leeway for the clamps 24, 36. Once the clamps 24, 36 have been located upon the base 12 with the fingers 62 of the bridge 54 received therein, the holding clamp 52 is received within the opening 44 and is secured to the raised portion 18 by the bolt 53 to slow the bridge 54 to be base 12.

Following assembly of the bridge 54 to the base 12 as just described, the load cell 94 is placed on the leveling seat 80 by having the load cell rest upon the pads 83, the side of the load cell in registration with the lands 84 and the openings 83 and 96 aligned. In this way, the load cell 94 is properly seated onto the seat 80 and the load cell is bolted to the seat by the screws 98. Thereafter, the platform 104 is secured to the load cell by the screws 114.

Thus, what has been shown and described is a unique mounting bracket for a load cell scale that can be assembled quickly and reliably so as not only to provide proper alignment for the load cell. It should be noted that no screws or bolts are required to connect the bridge 54 to the clamps 24, 36, that alignment is achieved between the clamps 24, 36 and the base 12 by the combination of openings 26, 28 and 40, 42 and the pins 22 and that only two bolts 32, 53 are required for assembly of the mounting device. This combination results in fast, accurate assembly of the load cell 94.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. A load cell mounting device comprising:
    a base,
    a longitudinally extending bridge,
    a longitudinally extending pair of arms extending from each end of said bridge, each of said pair of arms having outwardly extending edges,
    a seat secured to said bridge for receiving a load cell,
    a pair of generally U-shaped clamps, each having a pair of longitudinally extending arms, said edges being receivable by said pair of clamp arms,
    a pair of bushings received at each location between an edge and a pair of arms of the U-shaped clamp, and
    means for connecting said U-shaped clamps on opposite longitudinal ends of said base.

2. The mounting device of claim 1 wherein said seat has a plurality of pads thereon.

3. The mounting device of claim 1 wherein said clamp arms have bosses, each boss being directed toward a paired clamp arm and said bushings have openings for receiving said bosses to support each of said bushings.

4. The mounting device of claim 3 wherein said edges are tapered.

* * * * *